(12) United States Patent
Hurley et al.

(10) Patent No.: US 10,699,067 B2
(45) Date of Patent: Jun. 30, 2020

(54) FORM DESIGN AND DATA INPUT IN WHICH A SERVER PROVIDES A REPOSITORY OF FORM TEMPLATES THAT ARE DISTRIBUTED TO MULTIPLE FORM FILING CLIENT SYSTEMS

(71) Applicant: j5 International IP Corporation, Douglas (IM)

(72) Inventors: Nicholas Vector Hurley, Onchan (IM); David Roy Fraser, Claremont (ZA); Matthew James Hampton, Bergvliet (ZA); Richard Mark Graham, Cape Town (ZA)

(73) Assignee: Hexagon Technology Center GmbH, Heerbrugg (CH)

( * ) Notice: Subject to any disclaimer, the term of this patent is extended or adjusted under 35 U.S.C. 154(b) by 0 days.

(21) Appl. No.: 15/176,693

(22) Filed: Jun. 8, 2016

(65) Prior Publication Data
US 2017/0357628 A1    Dec. 14, 2017

(51) Int. Cl.
| G06F 40/18 | (2020.01) |
| G06F 3/0484 | (2013.01) |
| G06F 40/174 | (2020.01) |
| G06F 40/186 | (2020.01) |

(52) U.S. Cl.
CPC .......... *G06F 40/18* (2020.01); *G06F 3/04847* (2013.01); *G06F 40/174* (2020.01); *G06F 40/186* (2020.01)

(58) Field of Classification Search
CPC .. G06F 3/04847; G06F 17/243; G06F 17/246; G06F 17/248

USPC ................ 715/212, 217, 221, 222, 224, 225
See application file for complete search history.

(56) References Cited

U.S. PATENT DOCUMENTS

| 6,565,609 | B1 * | 5/2003 | Sorge ................ G06F 17/30569 |
| | | | 707/E17.006 |
| 7,779,431 | B2 * | 8/2010 | Wallace ................ G06F 17/246 |
| | | | 715/700 |
| 2004/0237045 | A1 * | 11/2004 | Meltzer .................. G06Q 10/10 |
| | | | 715/234 |
| 2007/0219956 | A1 * | 9/2007 | Milton .................. G06F 17/246 |

OTHER PUBLICATIONS

Blattner et al., Special Edition Using Microsoft Office Excel 2000; May 3, 1999; Que Publishing; pp. 2-4, 38, 39, 41, 42, 47-50, 238-241, 519-524, and 756-761.*

(Continued)

*Primary Examiner* — Andrew R Dyer
(74) *Attorney, Agent, or Firm* — Christopher M. Scherer; DeWitt LLP

(57) ABSTRACT

Methods and systems for form design and data input collection are described. The method at a server system includes receiving a form template in which multiple cells are provided in an array, wherein in the form template a plurality of the cells define formula-based values, and a plurality of the cells include metadata specifying a required format of a cell input. The method includes rendering the form template as a form instance including providing displayable input controls for fields of the form instance based on the cell metadata in corresponding cells of the form template; receiving user inputs into fields in the form instance; and evaluating user inputs to update formula-based values for cells.

18 Claims, 10 Drawing Sheets

(56) References Cited

OTHER PUBLICATIONS

Automatically hide rows in Excel based on value per row; Jun. 1, 2013; Microsoft Community; pp. 1-5.*
Instance; Mar. 6, 1998; Free On-Line Dictionary of Computing, pp. 1-2.*
Conditionally Hide Rows or Columns; Sep. 28, 2006; Free Excel\VBA Forum; pp. 1-5.*
Chip Pearson; CPearson.com; Oct. 28, 2012; pp. 1-6.*

* cited by examiner

FIG. 4A

| | A | B | C | D | | Properties | Sections |
|---|---|---|---|---|---|---|---|
| 1 | Date of Incident | Description | | Document(s) | | Integer 1 | |
| 2 | <Date & Time> | <Rich Text> | | <Attachment> | | ∨ Type | |
| 3 | Incident Reported By | | | | | Type | Integer ∨ |
| 4 | <Choice> | | | | | | Label |
| 5 | Date of Report | | | Picture(s) | | ∨ Va | Text |
| 6 | <Date & Time> | | | <Attachment> | | Source | Number |
| 7 | Category | | | | | Requi | Integer |
| 8 | <Choice> | | | | | | Choice |
| 9 | Provide details of the injured employee(s): | | | | | Value | Checkbox |
| 10 | Name | <Text> | Job Title | <Text> | | | Checklist Item |
| 11 | Age | <Integer> | Job at time of injury | <Text> | | Test V | Rich Text |
| 12 | Length of Time with | <Integer> | Length of Time in | <Integer> | | | Date & Time |
| 13 | Description and severity | <Integer> | | | | ∨ Fo | Date |
| 14 | | | | | | | Attachment |
| | | | | | | Style | Default |
| | | | | | | Number | Decimal Points |
| | | | | | | | ☐ Format as perc |

FIG. 4B

| | A | B | C | D | | Properties | Sections |
|---|---|---|---|---|---|---|---|
| 1 | Tank | | Bbls/m | Bbls | | Number10 | |
| 2 | Tk 506 | Information > | | 34731.98 | | | |
| 3 | Tk 407 | Logical > | | 8690 | | =SUM(D2:D4) | |
| 4 | Tk 159 | Mathematics > AVERAGE | | 11264.68 | | | |
| 5 | | Statistical > COUNT | | =SUM(D2:D4) | | | |
| 6 | | Text > MAX | | | | Default | |
| 7 | | JS Functions > MIN | | | | | |
| 8 | | | | | | Decimal Points 2 | |
| 9 | | | | | | ☐ Format as percentage | |
| 10 | | | | | | | |

FORM DESIGN AND DATA INPUT IN WHICH A SERVER PROVIDES A REPOSITORY OF FORM TEMPLATES THAT ARE DISTRIBUTED TO MULTIPLE FORM FILING CLIENT SYSTEMS

FIELD OF THE INVENTION

The technology described in this application relates to form design and data input. In particular, it relates to spreadsheet-based form design.

BACKGROUND TO THE INVENTION

Business processes that require collaboration between different people are often supported by the completion and submission of forms. Many organisations have replaced, or are replacing, paper forms with electronic ones and there are many different ways to do so. However, one of the common approaches involves the use of spreadsheets as templates for forms.

In this case, the business process owner either creates, or supervises the creation, of a template spreadsheet document. A user participating in the business process will then make a copy of the template spreadsheet, filling values in to some of the cells that are blank in the template, and will submit the newly completed spreadsheet form, for example, by attaching it to an email.

Spreadsheets employ a declarative dataflow programming paradigm known as cell-oriented programming. This has been widely adopted by users who would not necessarily regard themselves as computer programmers, but who are sometimes carrying out programming activities through spreadsheets. Spreadsheets are now regarded as one of the most ubiquitous End User Programming (EUP) tools.

This paradigm allows the expression of a set of related logical constructs without having to focus on the particular flow of execution that the computer processor will carry out, as the execution engine is tasked with doing this in a manner transparent to the user. The spreadsheet concept also includes a two-dimensional (or even three-dimensional when extended to multiple sheets) visual layout of data and text that is intuitive and effective.

Forms that support business processes often benefit from being encoded in spreadsheets for a number of reasons, including: the layout of spreadsheets in rows and columns, allowing heterogeneous data to utilise a two-dimensional area effectively in a semi-structured fashion; calculations of values dependent on user-inputted data are often useful (for example, aggregate totals or conversion to other units); macros or spreadsheet extensions allow sourcing of relevant data from other computer systems.

A spreadsheet-based system is 'Do-It-Yourself' for the large number of end users that are comfortable with spreadsheet technology. Compared to an enterprise solution, this can make it faster, and, at least initially, less costly, to get an electronic system in place because it does not require the same level of specialist technical services to implement.

However, these advantages are sometimes counter-balanced by some disadvantages, particularly when considered from an enterprise perspective. The disadvantages include the lack of an ability to distinguish between user-entered data and the structure of the form (although this can be mitigated by protecting cells, there is no distinct categorization). The data is semi-structured at best. There is also a lack of an ability to deal with different record sets relating to the same form structure, including summarizing and querying across different record sets—since each form is in a separate file. There is also a lack of workflow tools to enable sequence control, allow for conditional logic, or track the status and approval of forms. The proliferation of files, including old or modified versions of template files, can be very difficult to manage.

It is these disadvantages, among others, that have led many organisations to invest in Business Process Management (BPM) software suites. These suites typically provide tools for designing form templates, together with a mechanism for defining dynamic behaviour. This may be in the form of an Application Programming Interface (API), or through the use of a flowchart-based workflow designer, for example, based on the Business Process Model and Notation (BPMN). They also typically store the data from submitted forms in a centralised database. Although these software suites effectively address many of the weaknesses of a spreadsheet-based system, they typically required highly trained technicians or professional computer programmers to implement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

According to a first aspect of the present invention there is provided a computer-implemented method for form design and data input comprising: receiving a form template in which multiple cells are provided in an array, wherein in the form template a plurality of the cells define formula-based values, and a plurality of the cells include metadata specifying a required format of a cell input: rendering the form template as a form instance including providing displayable input controls for fields of the form instance based on the cell metadata in corresponding cells of the form template; receiving user inputs into fields in the form instance; and evaluating user inputs to update formula-based values for cells.

Receiving a form template may receive a form template from a server and wherein the method may include sending the user inputs into fields in a form instance to the server for compilation. The method may further send values of formula-based cells to the server.

The form template may include validation rules, and the method may include evaluating user inputs in the form instance to apply the validation rules. The form template may include workflow functions, and the method may include evaluating user inputs in the form instance to apply workflow functions.

According to a second aspect of the present invention there is provided a computer-implemented method for form design and data input collection comprising, at a form designer system: creating a form template in a user interface, wherein the form template is a spreadsheet format and includes multiple cells provided in an array, including: defining one or more cells provided in the array with formula-based values; and defining one or more cells provided in the array with metadata specifying a required format of a cell input when the form template is interpreted as a form instance; and sending the form template to a server for providing to form filling users.

Creating a form template may include defining validation rules for the inputs into a form instance of the form template.

Creating a form template may include defining workflow functionality for the inputs into a form instance of the form template.

According to a third aspect of the present invention there is provided a system for form design and data input comprising: a processor and a memory configured to provide computer program instructions to the processor to execute functions of components; a form template obtaining component for receiving a form template in which multiple cells are provided in an array, wherein in the form template a plurality of the cells define formula-based values, and a plurality of the cells include metadata specifying a required format of a cell input; a rendering component for rendering the form template as a form instance including providing displayable input controls for fields of the form instance based on the cell metadata in corresponding cells of the form template; a data input receiving component for receiving user inputs into fields in the form instance; and an evaluating component for evaluating user inputs to update formula-based values for cells.

The form template obtaining component may be provided at a client system and may receive a form template from a server-based form engine and wherein the system may include a data input sending component for sending the user inputs into fields in a form instance to the server-based form engine for compilation.

The form template may include validation rules and the evaluating component may include a validation rules component for evaluating user inputs in the form instance to apply the validation rules.

The form template may include workflow functions and the evaluating component may include evaluating user inputs in the form instance to apply workflow functions.

The system may include a server-based form engine including: a form template receiving component for receiving a form template from a designer system and making the form template available to form filling client applications; and a data receiving component for receiving user inputs into fields in a form instance to the server-based form engine for compilation.

According to a fourth aspect of the present invention there is provided a design system for form design and data input comprising: a processor and a memory configured to provide computer program instructions to the processor to execute functions of components; a template creating component for creating a form template in a user interface, wherein the form template is a spreadsheet format and includes multiple cells provided in an array, including: a cell formula component for defining one or more cells provided in the array with formula-based values; and a cell format component for defining one or more cells provided in the array with metadata specifying a required format of the cell input when the form template is interpreted as a form instance; and a template sending component for sending the form template to a server for providing to form filling users.

The template creating component may include a validation rules component for defining validation rules for the inputs into a form instance of the form template.

The template creating component may include a workflow component for defining workflow functionality for the inputs into a form instance of the form template.

According to a fifth aspect of the present invention there is provided a computer program product for form design and data input collection, the computer program product comprising a computer-readable medium having stored computer-readable program code for performing the steps of: receiving a form template in which multiple cells are provided in an array, wherein in the form template a plurality of the cells define formula-based values, and a plurality of the cells include metadata specifying a required format of the cell input; rendering the form template as a form instance including providing displayable input controls for fields of the form instance based on the cell metadata in corresponding cells of the form template; receiving user inputs into fields in the form instance; and evaluating user inputs to update formula-based values for cells.

According to a sixth aspect of the present invention there is provided a computer program product for form design and data input collection, the computer program product comprising a computer-readable medium having stored computer-readable program code for performing the steps of: creating a form template in a user interface, wherein the form template is a spreadsheet format and includes multiple cells provided in an array, including: defining one or more cells provided in the array with formula-based values; and defining one or more cells provided in the array with metadata specifying a required format of a cell input when the form template is interpreted as a form instance; and sending the form template to a server for providing to form filling users.

The computer program product may comprise a non-transient computer-readable medium.

Embodiments of the invention will now be described, by way of example only, with reference to the accompanying drawings.

BRIEF DESCRIPTION OF THE DRAWINGS

In the drawings:

FIGS. 4A to 4D are illustrative screenshots showing features of a spreadsheet format template design at a form designer component;

FIGS. 5A to 5D are illustrative screenshots showing features of form instance at a form filling client system as converted from a form template;

DETAILED DESCRIPTION WITH REFERENCE TO THE DRAWINGS

The described technology provides method and systems for form generation and data input collection in which the form design is based on a spreadsheet format with associated cell based inputs to which formulae may be applied.

A form makes it straightforward to capture information in data input fields of the form from multiple data provider users and to organize and edit the information. Forms may have simple fields in which any form of data may be entered or complex fields which may include "list boxes" that allow a user to select from a specific list of items and "spin buttons" that allow the user to choose a value.

The described technology leverages the widely accepted and understood format of spreadsheet applications to enable form design based on a spreadsheet format to be carried out and a template converted to a distributable form format.

A spreadsheet is an interactive computer application for organization, analysis and storage of data in tabular form. The application operates on data entered in cells of an array, organized in rows and columns. Each cell of the array may contain either numeric or text data, or the results of formulae that automatically calculate and display a value based on the contents of other cells. As well as performing basic arithmetic and mathematical functions, spreadsheets provide built-in functions for common financial and statistical operations. Spreadsheet programs also provide conditional expressions, functions to convert between text and numbers, and functions that operate on strings of text. The cell-oriented spreadsheet formula-based programming language is used as a basis in the described technology for end-user programming within a form design which is then converted to a form format for distribution and data capture.

Figure 1:
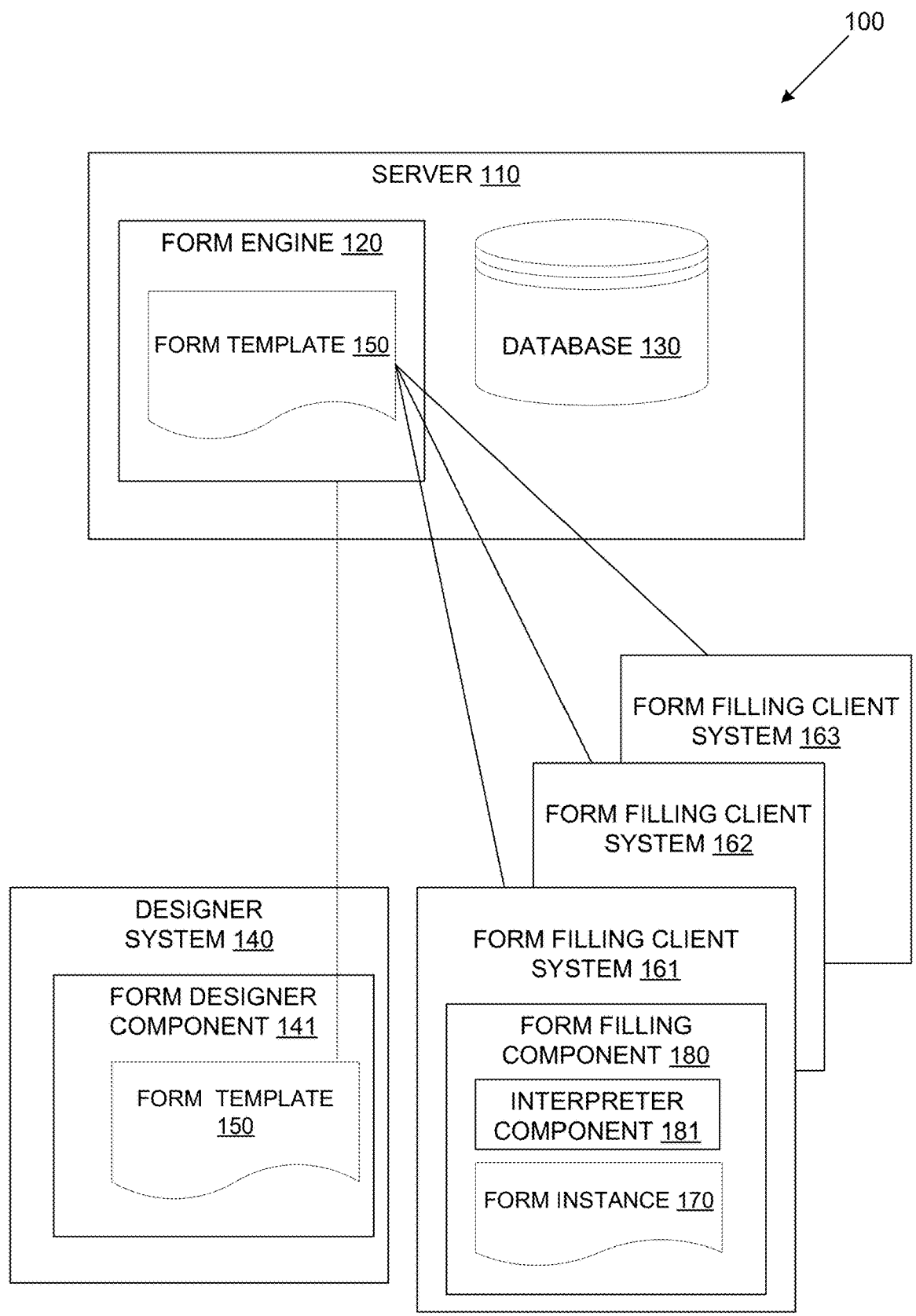
FIG. 1 is a schematic illustration of an embodiment of a system for form design and data input collection according to the technology.

FIG. 1 illustrates an embodiment of the described system (100) for spreadsheet-based form design and data input collection. A server (110) may be provided with a form engine (120) which provides a repository of form templates (150) which are distributed to form filling client systems (161-163) where they are interpreted as form instances (170). Data input via the form filling client systems (161-163) may be collated and analyzed by the form engine (120). The form engine (120) may store the data input received from the form instances (170) in a database (130).

A designer system (140) may be provided which may be a client system remote from the server (110) or may be integrated with the server (110). The designer system (140) may include a form designer component (141) for design of a form template (150). The form designer component (141) may be a spreadsheet-based application that may be used via a user interface of the designer system (140). The spreadsheet-based application uses the two-dimensional layout principles of a spreadsheet and allows calculated values to be included in the form based on the cell-oriented programming paradigm, in the spreadsheet formula-based language familiar to users. Spreadsheet functionality of cell-oriented spreadsheet formulae may be applied which may be incorporated into a form instance (170) once the form template (150) is interpreted. The form designer component (141) may enable copy-and-paste functionality from a spreadsheet application (for example, EXCEL® or GOOGLE SHEETS®).

Additional functionality may be provided by the form designer component (141) for defining further features which are incorporated into the form template (150) and applied when the form template (150) is interpreted as a form instance (170). In particular, the additional functionality may include rich metadata specifying a required format or type of data of a field in the form template. The additional functionality may also include defining validation rules and other supporting logic using the formula-based programming language for the input fields of the form template. Additional functionality may also include defining a layer of simple workflow functionality for the fields of the form template that allows the form designer to formalize the sequence of activities in the business process, and to provide for conditional logic, also using the formula-based programming language where applicable.

The server based form engine (120) may receive a form template (150) from the form designer component (141) and provide the form template (150) for distribution to form filling client systems (161-163).

The form engine (120) allows business process participants to complete and submit the forms designed with the form designer component (141) using client software (for example, a web browser) at the form filling client systems (161-163).

The form filling client systems (161-163) may include a form filling component (180) including an interpreter component (181) for interpreting a form template (150) and providing a form instance (170) for input of data at the client system (161-163). The form template (150) that is created using the form designer may be stored in a proprietary file format that may be used by the form filling client systems (161-163) directly without conversion.

The interpreter component (181) may include functionality as explained further below for interpreting the cell-oriented spreadsheet formulae of the form template (150) as well as the additional functionality defined in the form template (150) including metadata specifying a required format of a cell input in a field, validation rules for the input fields, and defining workflow functionality for the fields.

The interpreter component (181) may faithfully reproduce the two-dimensional layout specified in form template (150) for each instance of the form. The interpreter component (181) may evaluate formulae to update calculated values, check the form validation rules, and enforce the workflow rules that were specified in the spreadsheet format template.

The form engine (120) may receive and record the data from each form instance (170) from form filling clients in a centralized database (130). The form engine (120) may therefore deal with multiple records of data generated for the same form template (150) and may provide ways to query and interact with those data sets.

In an alternative embodiment, the form engine (120) at the server (110) may implement the interpretation of a form template (150) for forwarding to a form filling client system (161-163) as a form instance (170); however, providing the interpretation functionality at the client makes it more responsive to the user.

In one embodiment, the designer system (140) may be provided at a client system which also includes the functionality of the form filling component (180) such that a user of the client system may act in both a form designer capacity and a form filling capacity.

This technology provides an intuitive way to combine two well-known paradigms (spreadsheets and BPM systems) in a way that adds a high level of functionality while retaining more familiarity and ease of use for untrained users than traditional workflow design systems.

Figure 2:
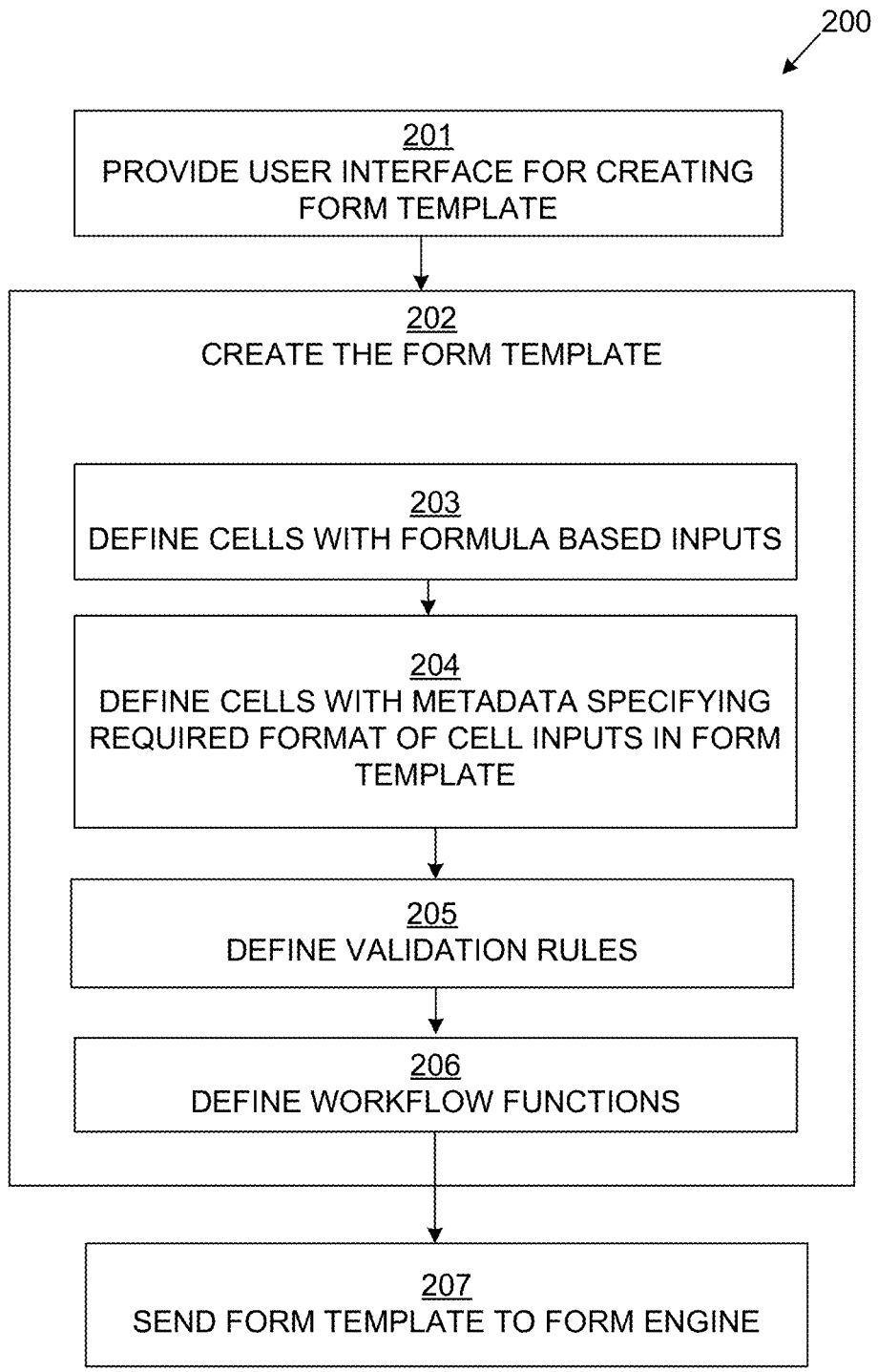
FIG. 2 is a flow diagram illustrating a method of form design according to the technology.

Referring to FIG. 2, a flow diagram (200) shows an example embodiment of the described method as carried out at the form designer component (141). The form designer component (141) may be an application interacted with by a user. The method may provide (201) a user interface for creating a spreadsheet format form template (150) for a form.

The method may create (202) the form template which may include selecting cells within the spreadsheet which are defined for inputs into fields of the form instance. Usual spreadsheet manipulations and editing may be used, for example to specify titles, merge cells, define the overall size, etc. Copy-and-paste from a spreadsheet application may be used.

Creating the form template may include defining (203) cells with formula-based values which may be dependent on other cell inputs and/or may import inputs from another source. Creating the form template may also include defining (204) cells with metadata specifying the required format or type input required in a field. Creating the form template may also include defining (205, 206) validation rules and workflow functions. Although these functions are shown in a sequence in the flow diagram, during the usual design process these may be defined in any order and may be inter-related.

Once completed, the form template may be sent (207) to the form engine (120) for distribution to form filling clients (161-163) for interpretation as form instances (170) and input data capture.

The form engine (120) may receive a form template (150) from a form designer component (141). The form template (150) may be provided to form filling clients for interpretation as form instances (170) and input of data. Input data may be received at the form engine (120) and compiled in a database (130). In an alternative embodiment, the form engine (120) may interpret the form template (150) and provide the form instances (170) to the form filling clients.

The form engine (120) may provide the form template (150) to the form filling client systems (161-163) essentially unaltered and the formula-based values, data input controls, validation rules and workflow are all displayed in a user interface through which a user may interact with the form data there.

Figure 3:
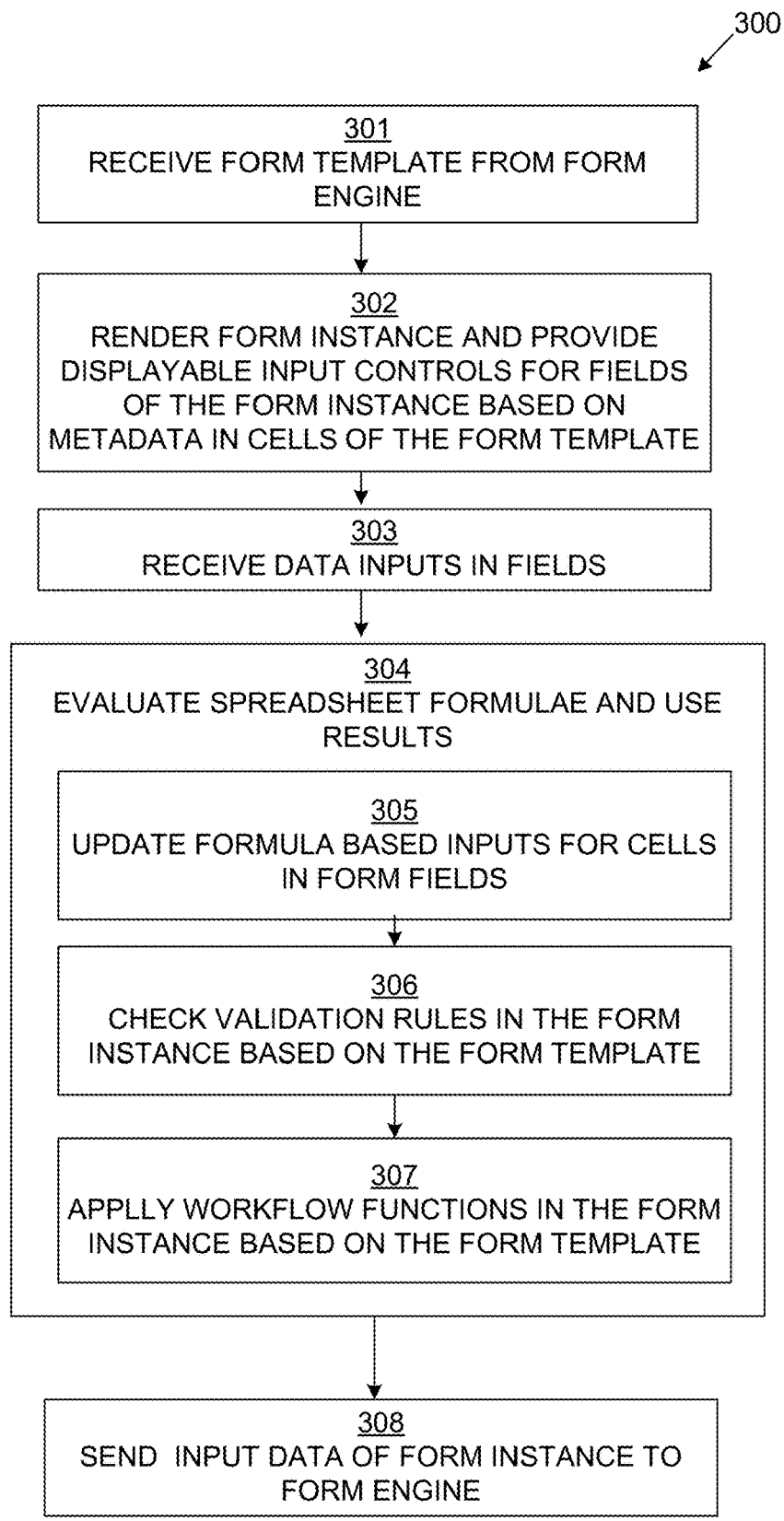
FIG. 3 is a flow diagram illustrating a method of form design and data input collection at a form filling client system according to the technology.

Referring to FIG. 3, a flow diagram (300) shows an example embodiment of the described method as carried out at a form filling client system (161).

A form filling component (180) at a form filling client system (161) may receive (301) or download a form template (150) from the form engine (120). In one embodiment, the form filling component (180) may be an application, such as a JAVASCRIPT™ application, that executes in a browser at the client system (161).

The form filling component (180) may render (302) a form instance (170) from the form template (150) including providing displayable input controls for fields of the form instance (170) based on the metadata in the cells of the form template (150) defining field input format or type. In one embodiment, the form filling component (180) may use hypertext markup language (HTML) templating to render the form instance (170) as an HTML page with appropriate input controls. In another embodiment, the form filling component (180) may use a native mobile application graphical user interface on a mobile smartphone operating system.

The user may enter data into the input fields of the form instance (170) and form filling component (180) may receive (303) the input data. The form filling component (180) may evaluate (304) any spreadsheet formulae and may use the results for the following steps. The results may be used to update (305) dependent formula-based values for cells in the form instance (170) and other form instance content that displays these cells. The results may also be used to check (306) validity constraints based on validation rules provided in the form template. The results may also apply (307) workflow functions that are defined in the form template, including enabling/disabling, hiding/showing parts of the form content in the form instance.

The input data of the form instance (170) may be provided to the form engine (120). The input data may be provided to the form engine (120) as it is entered and when any change is made to the form instance by the user. In one embodiment, the values for formula-based cells may be sent to the form engine (120) along with the user entered values which saves the form engine (120) from having to re-evaluate the expressions. A completed form instance may be exported with user input data to a format such as a portable document format (PDF).

Referring to FIGS. 4A to 4D, screenshots (410, 420, 430, 440) are shown of an example implementation of a form designer component (141) which are used to illustrate features of the form designer component (141).

FIG. 4A illustrates that the form designer component (141) uses the two-dimensional layout principles of a spreadsheet, allowing a business process owner, or someone that they are supervising, to quickly put a form template (150) together based on spreadsheet formatting that makes efficient use of space. Cells may be merged (411) to allow for input or display fields of different sizes.

Each cell has metadata (412) that can be configured through an input control of the form designer component (141). In this example, a drop down menu of properties (413) is provided through which types, values and formats of a cell may be defined. This specifies, for example, which cells contain labels (414), which contain user entered data, and which contain calculated values. For user entered data, the form designer can specify what type of data is required to be entered for that cell.

FIG. 4B illustrates that cells may be populated with calculated values based on the cell-oriented programming paradigm, in the spreadsheet formula language familiar to users. The screenshot (420) shows a menu (421) of formulae which may be selected and cells (422) which may be populated with calculated values based on the formulae. This language supports expressions including the following: unary (−, %) and binary mathematical operators (+, −, *, /, ^); Boolean operators (=, < >, <, <=, >, >=); a text concatenation operator (δ); parentheses allowing for modifications to normal order of operations (precedence rules); and predefined function calls. A library of commonly used spreadsheet functions may also be provided.

Figures 4C, 4D:
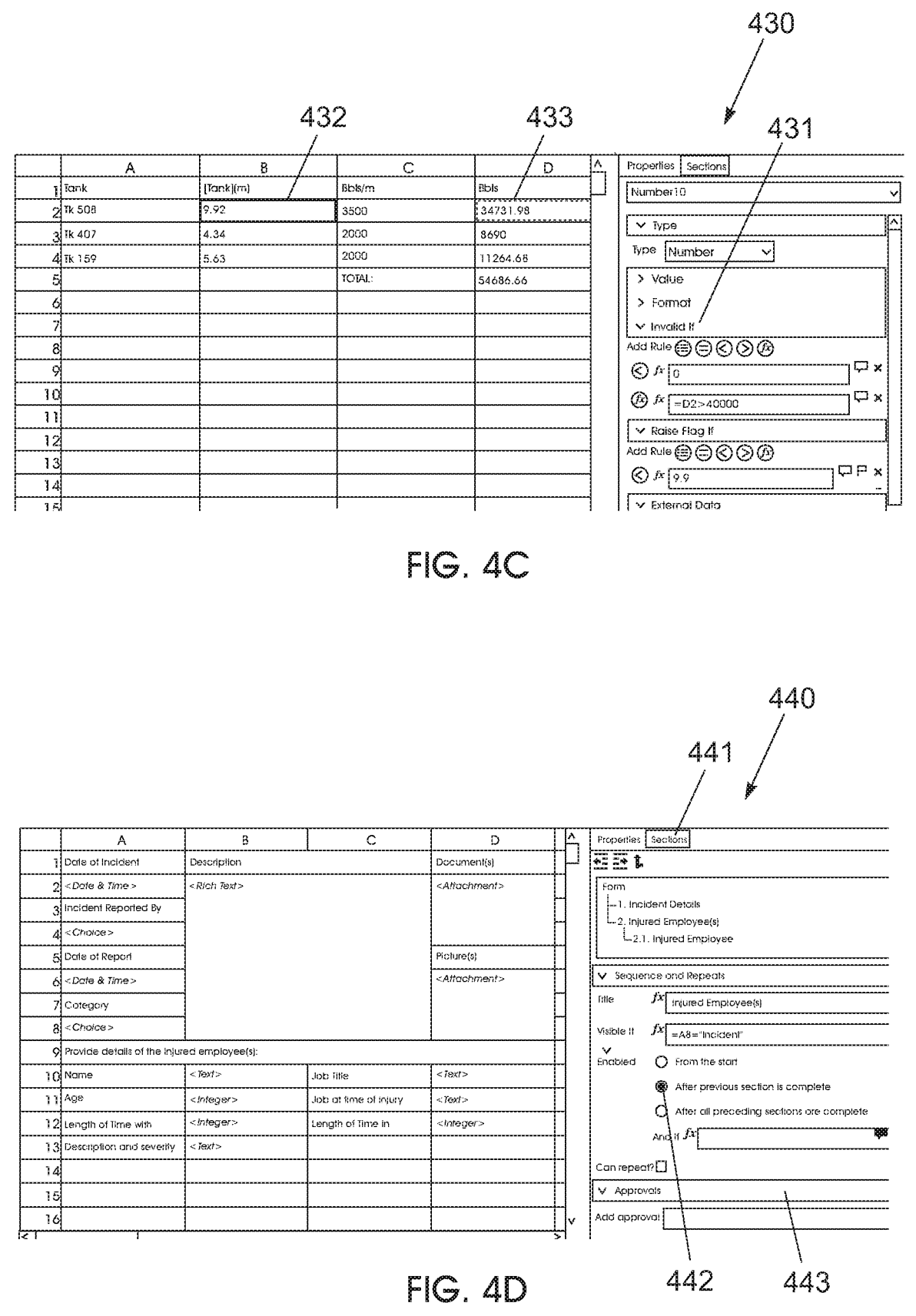

FIG. 4C illustrates that the form designer component (141) allows for the configuration of form data validation rules by providing a validation input control (431). As with the calculated values, the formula-based programming language may be used for these rules if applicable. This allows for rich form validation without requiring specialized computer programming. The forms engine may provide built-in validation that entered data is of the correct type, based on the cell metadata configured. However, it is often important to specify additional validation with a form design based on specific content of that form.

In this example, the validation rule is that when a user enters a value in cell B2 (432), it is marked as invalid if the calculated value in cell D2 (433) is greater than 40,000. The value of cell D2 (433) is dependent on the user entered value in B2 (432).

FIG. 4D illustrates workflow functions may be provided. In order to systematically formalise a business process, it is helpful to specify the sequence of activities in the business process as part of the form design. There are also many business processes that have conditional logic (for example, only requiring the user to complete a section of the form if they provide a particular answer to a question in an earlier part of the form).

In order to enable this workflow design, the form designer component (141) allows a form to be split into sections (441), and provides additional configuration points (442) for each section. The form designer can control when a section becomes enabled (i.e. can be edited), and when it is visible. The formula-based programming language can be used to specify these conditions if applicable.

In addition, there are configuration points for required approvals (443) for a section. If these are configured, after the user has submitted a completed form, the appropriate reviewers will need to review and approve the content, or send it back for revision. The forms engine provides built-in support for this workflow.

The forms engine (120) is a server-based application that allows business process participants to complete and submit the forms designed with the form designer component (141) using client software (for example, a web browser) at a form filing client (161).

Referring to FIGS. 5A to 5D, screenshots (510, 520, 530, 540) are shown of an example implementation of a form instance (170) provided at a form filling client (161).

Figures 5A, 5B:
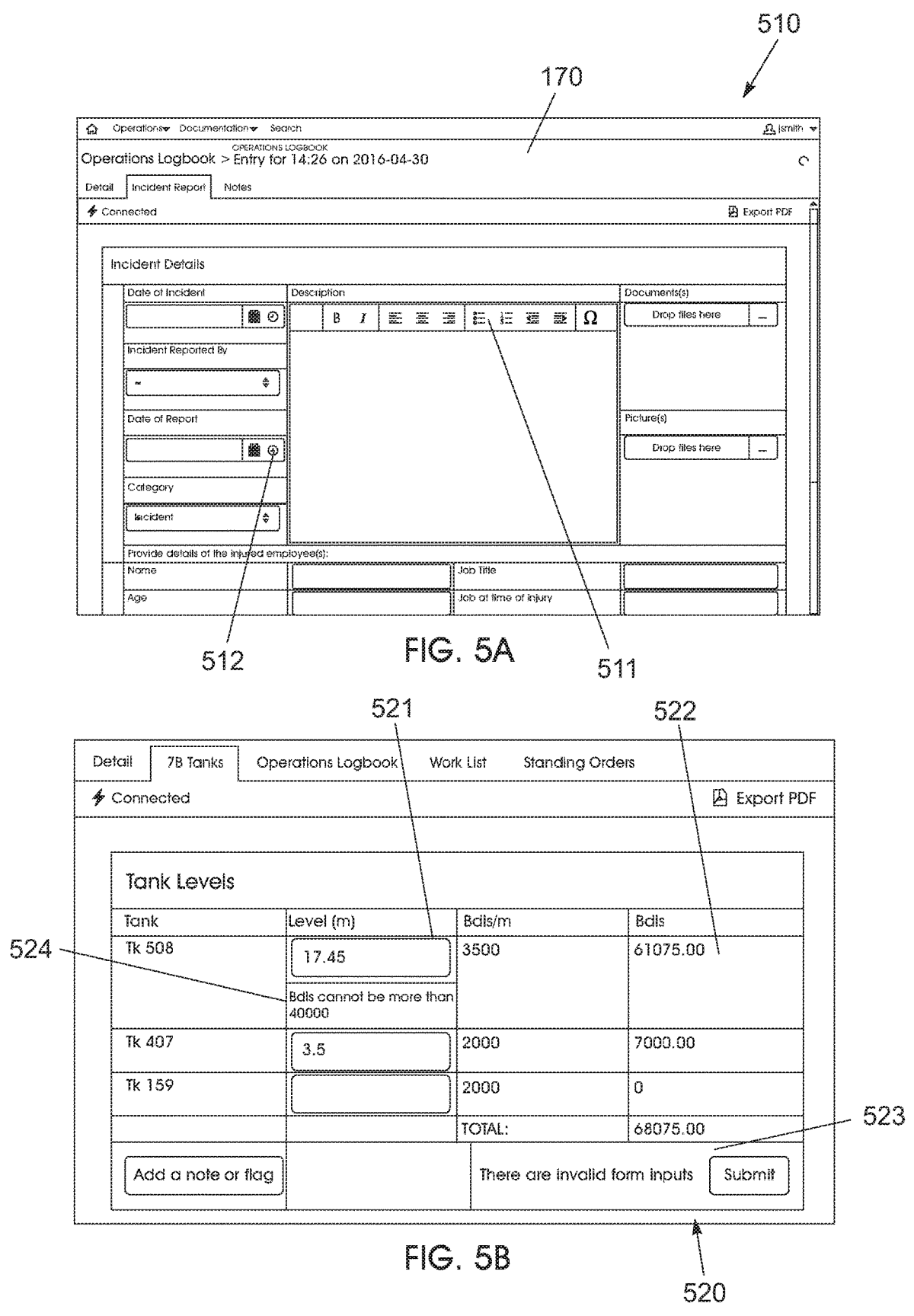

FIG. 5A illustrates how the form instance (170) rendered in the form filling client (161) shown in the screenshot (510) faithfully reproduces the two-dimensional layout specified in the form template (150) being designed in FIG. 4A. Each instance of the form template displays the appropriate input controls (511, 512) based on the data type configured for each input. For example, where input type <Rich Text> was specified, text editing controls (511) are provided and where input type <Date & Time> was specified, calendar and clock controls (512) are provided.

Once the form instances (170) are provided to users, as the user updates input fields in the form, the form filling component (180) at the form filling client (161) evaluates any configured formulae to update calculated values. It also checks form validation rules. This is illustrated in FIG. 5B which shows an input field (521) and a calculated field (522) corresponding to the cells (432, 433) in FIG. 4C. An invalid prompt is provided (523) based on the custom form validation (524).

Figures 5C, 5D:
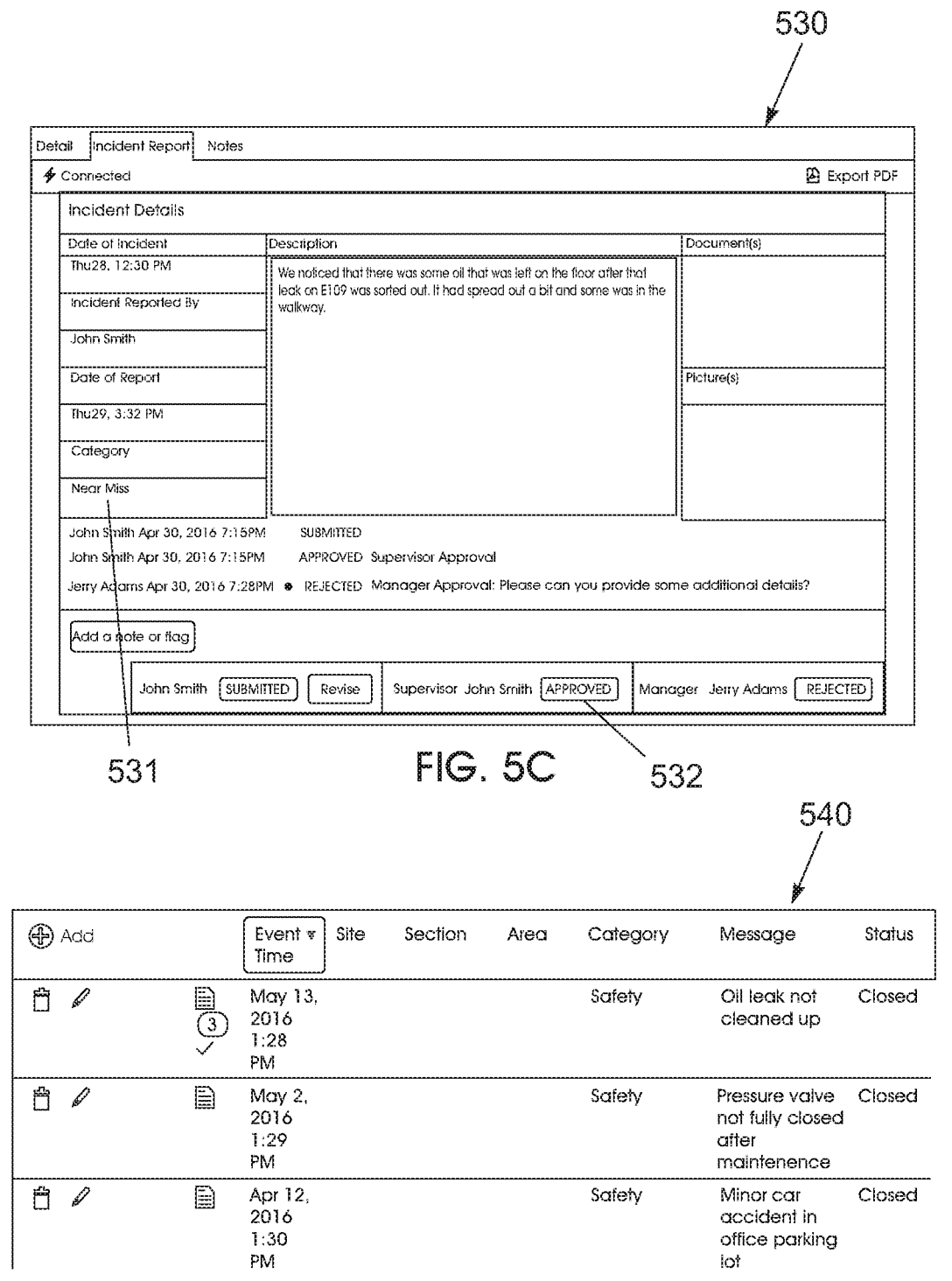

FIG. 5C illustrates that the form filling component (180) also enforces configured workflow rules, including the built-in workflow for approvals. In this case, the entry is a "Near Miss", not an "Incident", so the conditionally visible second section about injuries is not shown (as provided in FIG. 4D). Built in submission, approval, revision implementation (532) is shown.

The forms engine (120) receives and stores the data from each form instance record in a centralised database (130). FIG. 5D illustrates the captured input data in a database (130). This means that it can therefore deal with multiple records of data generated for the same form template, and provide ways to query and interact with those data set, for example, providing summarized information relating to instances of the form.

The described technology brings the familiarity and end-user programmability of a spreadsheet into an enterprise BPM solution and has the potential to enable rapid digitisation of business processes in an enterprise way, without needing the services of trained technicians or professional computer programmers.

Figure 6:
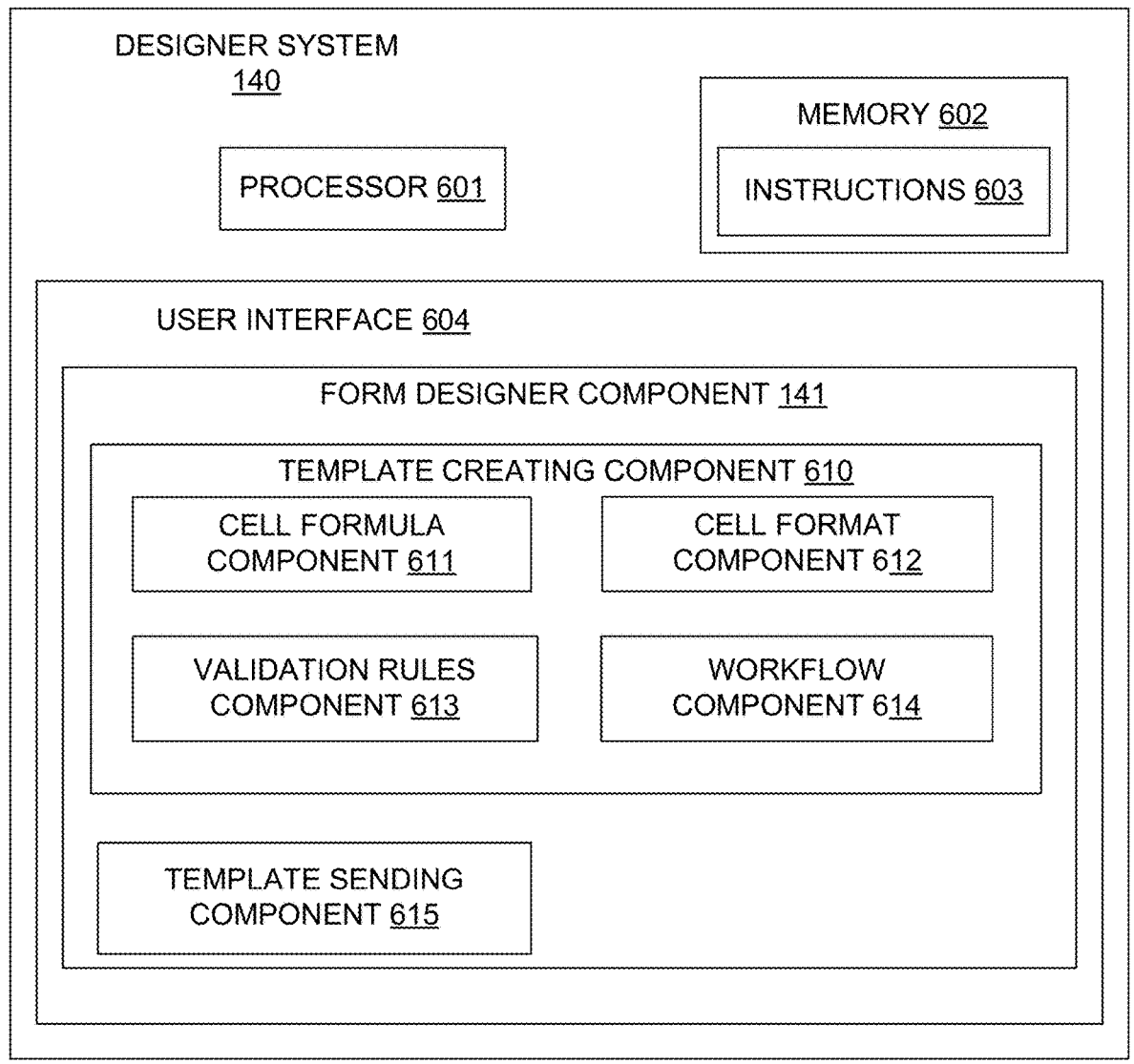
FIG. 6 is a block diagram of logical components of an example embodiment of a form designer component.

Referring to FIG. 6, a designer system (140) is shown which may be a client computer for example in the form of a desktop computer, laptop computer, tablet or smartphone. The designer system (140) may include at least one processor (601), a hardware module, or a circuit for executing the functions of the described components. The described components of the system may be software units executing on the at least one processor (601). Memory (602) may be configured to provide computer instructions (603) to the at least one processor (601) to carry out the functionality of the components.

The designer system (140) may include a form designer component (141) which may be in the form of an application which may be displayed on a user interface (604) with user input controls. The form designer component (141) may include a template creating component (610) for creating a form template in the user interface (604). The form template includes multiple cells provided in an array. The template creating component (610) may include a cell formula component (611) for defining one or more cells provided in the array with formula-based values.

A template sending component (615) may be provided for sending the spreadsheet format template to a server for access by form filling client systems. The form template (150) that is created using the form designer component (141) may be stored in a proprietary file format that may be used by the form filling client systems directly without conversion.

The template creating component (610) may include a cell format component (612) for defining one or more cells provided in the array with metadata specifying a required format of the cell input in the form template. The template creating component (610) may also include a validation rules component (613) for defining validation rules for the inputs to the form template and a workflow component (614) for defining workflow functionality for the inputs to the form template.

Figure 7:
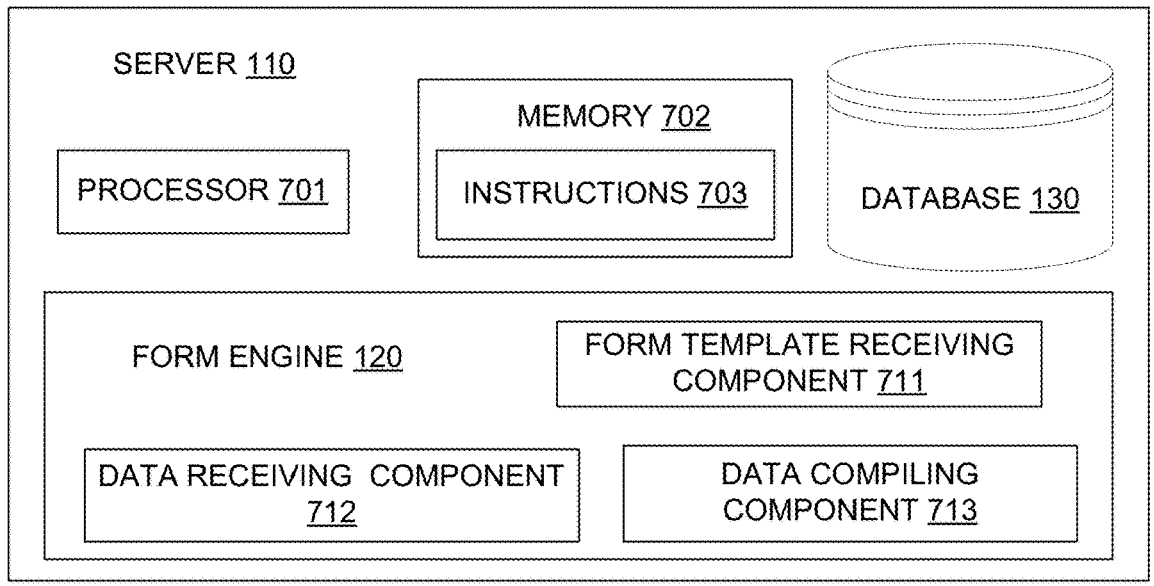
FIG. 7 is a block diagram of logical components of an example embodiment of a form engine at a server system.

Referring to FIG. 7, an exemplary server (110) is shown at which a form engine (120) is based. The server (110) may include at least one processor (701), a hardware module, or a circuit for executing the functions of the described components. The described components of the system may be software units executing on the at least one processor (701). Memory (702) may be configured to provide computer instructions (703) to the at least one processor (701) to carry out the functionality of the components. The server (110) provided may be multiple servers provided at various locations, for example, as a cloud based architecture.

The form engine (120) may include a form template receiving component (711) for receiving a form template in which multiple cells are provided in an array. In the form template, a plurality of the cells define formula-based values, and a plurality of the cells include metadata specifying a required format of the cell input.

The form engine (120) makes the form template available to form filling client systems (161), for example, for download for interpreting locally at the form filling client system (161). In an alternative embodiment, the form template may be available to view and interact with via the form engine (120).

The form engine (120) includes a data receiving component (712) for receiving input data for form instances from form filling client systems (161). The form engine (120) may include a data compiling component (713) for compiling the input data in a database (130).

Figure 8:
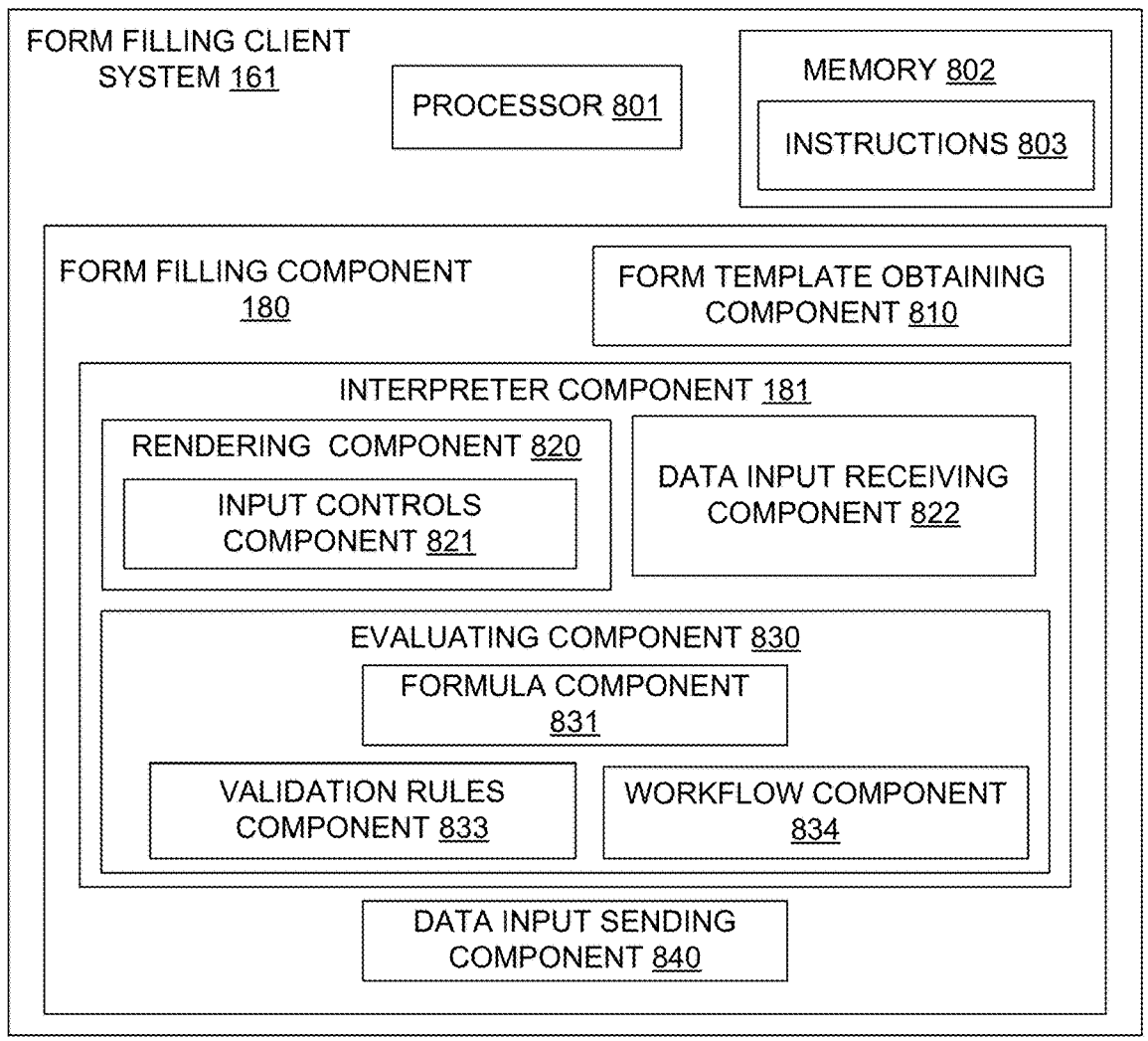
FIG. 8 is a block diagram of logical components of an example embodiment of a form filling component.

Referring to FIG. 8, a form filling client system (161) is shown which may be a client computer, for example in the form of a desktop computer, laptop computer, tablet or smartphone. The form filling client system (161) may include at least one processor (801), a hardware module, or a circuit for executing the functions of the described components. The described components of the system may be software units executing on the at least one processor (801). Memory (802) may be configured to provide computer instructions (803) to the at least one processor (801) to carry out the functionality of the components.

The form filling client system (161) may include a form filling component (180) which may be an application (for example, a JAVASCRIPT™ application) that executes in the browser of the form filling client system (161). The form filling component (180) may include a form template obtaining component (810) for obtaining a form template from a form engine (120) of a remote server (110).

The form filling component (180) may include an interpreter component (181) for interpreting the form template as a form instance and evaluating data input into the form instance. The interpreter component (181) may include a rendering component (820) for rendering a form instance including an input controls component (821) for providing appropriate user interface controls for fields in the form instance. The input controls component (821) may provide displayable input controls for fields of the form template based on the cell metadata in corresponding cells of the spreadsheet format template.

The interpreter component (181) may include an evaluating component (830) for evaluating cells and defined rules as data inputs are received in the form instance. The evaluating component (830) may include a formula component (821) for maintaining formula-based values for cells from the form template in the fields of the form instance. The evaluating component (830) may include a validation rules component (833) for applying validation rules in the form instance as specified in the form template. The evaluating component (830) may also include a workflow component (834) for providing workflow functionality to the form instance as specified in the form template.

The form filling component (180) may include data input sending component (840) for posting data inputs to the form engine (120).

Figure 9:
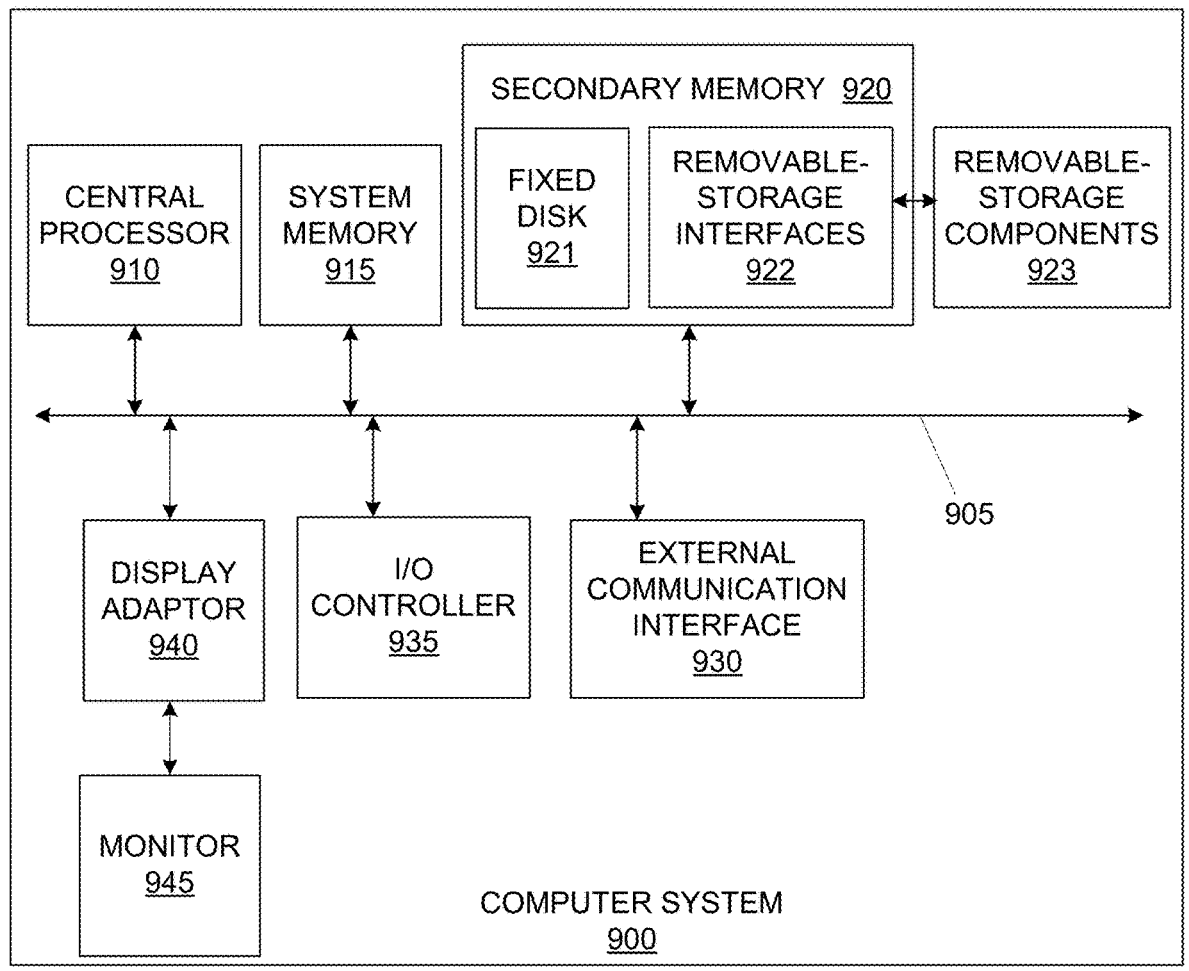
FIG. 9 illustrates an example of a computer system in which various aspects of the disclosure may be implemented.

FIG. 9 illustrates an example of a computer system (900) in which various aspects of the disclosure may be implemented including the server (110), designer client system (140), and form filing client systems (161-163). The computer system (900) may be suitable for storing and executing computer program code. The various participants and elements in the previously described system diagrams, may use any suitable number of subsystems or components of the computer system (900) to facilitate the functions described herein. The computer system (900) may include many different forms of device including, but not limited to, personal computer systems, server computer systems, thin clients, thick clients, hand-held or laptop devices, multiprocessor systems, microprocessor systems, microprocessor-based systems, programmable consumer electronics, mini-computer systems, smartphones, tablets, and the like.

The computer system (900) may include subsystems or components interconnected via a communication infrastructure (905) (for example, a communications bus, a cross-over bar device, or a network). The computer system (900) may include one or more central processors (910) and at least one memory component in the form of computer-readable media. In some configurations, a number of processors may be provided and may be arranged to carry out calculations simultaneously.

The memory components may include system memory (915), which may include read only memory (ROM) and random access memory (RAM). A basic input/output system (BIOS) may be stored in ROM. System software may be stored in the system memory (915) including operating system software. The memory components may also include secondary memory (920). The secondary memory (920) may include a fixed disk (921), such as a hard disk drive, and, optionally, one or more removable-storage interfaces (922) for removable-storage components (923). The removable-storage interfaces (922) may be in the form of removable-storage drives (for example, magnetic tape drives, optical disk drives, etc.) for corresponding removable storage-components (for example, a magnetic tape, an optical disk, etc.), which may be written to and read by the removable-storage drive. The removable-storage interfaces (922) may also be in the form of ports or sockets for interfacing with other forms of removable-storage components (923) such as a flash memory drive, external hard drive, or removable memory chip, etc.

The computer system (900) may include an external communications interface (930) for operation of the computer system (900) in a networked environment enabling transfer of data between multiple computer systems (900). Data transferred via the external communications interface (930) may be in the form of signals, which may be electronic, electromagnetic, optical, radio, or other types of signal. The external communications interface (930) may enable communication of data between the computer system (900) and other computer systems including servers and external storage facilities. Web services may be accessible by the computer system (900) via the communications interface (930). The external communications interface (930) may also enable other forms of communication to and from the computer system (900).

The computer-readable media in the form of the various memory components may provide storage of computer-executable instructions, data structures, program modules, software units and other data. A computer program product may be provided by a computer-readable medium having stored computer-readable program code executable by the central processor (910). A computer program product may be provided by a non-transient computer-readable medium, or may be provided via a signal or other transient means via the communications interface (930).

Interconnection via the communication infrastructure (905) allows the central processor (910) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, and the like) may couple to the computer system (900) either directly or via an I/O controller (935). These components may be connected to the computer system (900) by any number of means known in the art, such as a serial port. One or more monitors (945) may be coupled via a display or video adapter (940) to the computer system (900).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, JAVA™, C++, or PERL™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method for form design and data input in which a server provides a repository of form templates for distribution to multiple form filling client systems comprising:
    via client software at a form filling client system, accessing an end-user programmable form template stored in a forms engine on a server, wherein the form template includes multiple cells, wherein a plurality of the cells define formula-based values, further wherein a plurality of the cells include metadata determining a functionality of corresponding fields in form instances, wherein the metadata of at least one cell provides that at least one functionality of at least one field in the form instances is dynamically determined after receiving a user input in the form instances, further wherein the functionality includes specifying a required format of a user input in a field in the form instance, defining when a section of the form instance is visible to the user, defining when a section of the form instance is editable by a user input in the form instance, and defining validation rules for fields in the form instance;
    via the client software at the form filling client system, converting the accessed form template into a form instance, wherein the form instance is a distributable form format, further wherein the conversion includes translating the metadata for the plurality of cells in the form template into a translated functionality for the corresponding fields in the form instance including defining fields in the form instance with configuration points from the form template that determine when the section of the converted form template is visible in the form instance, defining fields of the form instance with configuration points from the form template to control when the section of the converted form template is editable with a user input in the form instance, and defining a validation input control of a user input in the form instance to ensure the user input is a correct type based on the metadata;
    rendering the form instance for display according to the conversion of metadata of the form template, including providing displayable user interface input controls for fields of the form instance, wherein at least one of the translated functionalities is dynamically responsive to a user input in the form instance, further wherein the displayable user interface input controls are displayed based on the cell metadata from the form template and are not displayed in the form template;
    receiving, via the client software at the form filling client system, user inputs into fields in the form instance;
    evaluating the user inputs by updating formula-based values for cells and by applying the validation rules; and
    sending the user inputs and values of formula-based cells to the server for storage in a database, wherein sending the inputs and values does not include sending the form instance or form template, wherein data input via multiple form instances of the form filling client systems is collated in the database and analyzed by the server.

2. The method as claimed in claim 1, wherein accessing a form template includes receiving a form template from the server.

3. The method as claimed in claim 1, wherein the form template includes workflow functions, and the method includes evaluating user inputs in the form instance by applying workflow functions.

4. The method as claimed in claim 3, wherein the workflow functions defined by a form designer input a sequence of activities of a business process using an end-user programming tool, and wherein the workflow functions split the form instance into sections configured for activation and display according to controls input into the form template.

5. The method as claimed in claim 1, wherein the client software includes a web browser.

6. The method as claimed in claim 1, wherein the form template is stored in a proprietary file format that is usable by the form filling client systems directly without conversion.

7. The method as claimed in claim 1, wherein the client software of the form filling client system uses hypertext markup language (HTML) templating by rendering the form instance as an HTML page with appropriate input controls.

8. The method as claimed in claim 1, the validation rules and metadata having been defined using an end-user programming tool.

9. The method as claimed in claim 1, wherein the form template includes a plurality of the cells which define formula-based values being dependent on one or both of other cell inputs and inputs imported from another source.

10. A computer-implemented method for form design and data input in which a server provides a repository of form templates for distribution to multiple form filling client systems comprising, at the server:
   providing an end-user programmable form template for accessing via client software at a form filling client system, wherein the form template includes multiple cells, wherein a plurality of the cells define formula-based values, further wherein a plurality of the cells include metadata determining a functionality of corresponding fields in form instances, wherein the metadata of at least one cell provides that at least one functionality of at least one field in the form instances is dynamically determined after receiving a user input in the form instances, further wherein the functionality includes specifying a required format of a user input in a field in the form instance, defining when a section of the form instance is visible to the user, defining when a section of the form instance is editable by a user input in the form instance, and defining validation rules for fields in the form instance,
   further wherein the form template is configured to be converted into a form instance using the client software at the form filling client system, wherein the form instance is a distributable form format, further wherein the conversion includes translating the metadata for the plurality of cells in the form template into a translated functionality for the corresponding fields in the form instance including defining fields in the form instance with configuration points from the form template that determine when the section of the converted form template is visible in the form instance, defining fields of the form instance with configuration points from the form template to control when the section of the converted form template is editable with a user input in the form instance, and defining a validation input control of a user input in the form instance to ensure the user input is a correct type based on the metadata, and
   further wherein the converted form template is configured to be rendered for display as the form instance according to according to the conversion of metadata of the form template, including providing displayable user interface input controls for fields of the form instance, wherein at least one of the translated functionalities is dynamically responsive to a user input in the form instance, further wherein the displayable user interface input controls are displayed based on the cell metadata from the form template and are not displayed in the form template;
   receiving, via the client software at the form filling system, user inputs and values of formula-based cells of the form instance, the user inputs received into fields in the form instance rendered by the client software at the form filling client system and evaluated by applying the validation rules at the form filling client system, wherein sending the inputs and values does not include sending the form instance or form template;
   storing the user inputs and values of formula-based cells in a database; and
   collating and analyzing data input via multiple form instances of the form filling client systems.

11. A system for form design and data input in which a server provides a repository of form templates for distribution to multiple form filling client systems comprising a processor and a memory configured to provide computer program instructions to the processor for executing the steps of:
   via client software at a form filling client system, accessing an end-user programmable form template stored in a forms engine on a server, wherein the form template includes multiple cells, wherein a plurality of the cells define formula-based values, further wherein a plurality of the cells include metadata determining a functionality of corresponding fields in form instances, wherein the metadata of at least one cell provides that at least one functionality of at least one field in the form instances is dynamically determined after receiving a user input in the form instances, further wherein the functionality includes specifying a required format of a user input in a field in the form instance, defining when a section of the form instance is visible to the user, defining when a section of the form instance is editable by a user input in the form instance, and defining validation rules for fields in the form instance;
   via the client software at the form filling client system, converting the accessed form template into a form instance, wherein the form instance is a distributable form format, further wherein the conversion includes translating the metadata for the plurality of cells in the form template into a translated functionality for the corresponding fields in the form instance including defining fields in the form instance with configuration points from the form template that determine when the section of the converted form template is visible in the form instance, defining fields of the form instance with configuration points from the form template to control when the section of the converted form template is editable with a user input in the form instance, and defining a validation input control of a user input in the form instance to ensure the user input is a correct type based on the metadata;
   rendering the form instance for display according to the conversion of metadata of the form template, including providing displayable user interface input controls for fields of the form instance, wherein at least one of the translated functionalities is dynamically responsive to a user input in the form instance, further wherein the displayable user interface input controls are displayed based on the cell metadata from the form template and are not displayed in the form template;
   receiving, via the client software at the form filling client system, user inputs into fields in the form instance;
   evaluating the user inputs by updating formula-based values for cells and by applying the validation rules; and
   sending the user inputs and values of formula-based cells to the server for storage in a database, wherein sending the inputs and values does not include sending the form instance or form template,
   wherein data input via multiple form instances of the form filling client systems is collated in the database and analyzed by the server.

12. The system as claimed in claim 11, wherein the memory is configured to provide computer program instructions to the processor for executing the step of:
   receiving a form template from the server.

13. The system as claimed in claim 11, wherein the form template includes workflow functions, and wherein the memory is configured to provide computer program instructions to the processor for executing the step of evaluating user inputs in the form instance by applying workflow functions.

14. The system as claimed in claim 11, including a server-based form engine including memory configured to provide computer program instructions to the processor for executing the steps of:
receiving a form template from a designer system and making the form template available to form filling client applications; and
receiving user inputs into fields in a form instance to the server-based form engine for compilation.

15. The system as claimed in claim 11, including a design system comprising a processor and a memory configured to provide computer program instructions to the processor for executing the steps of:
creating an end-user programmable form template in a user interface, wherein the form template includes multiple cells provided in an array, including:
defining one or more cells provided in the array with formula-based values; and
defining one or more cells provided in the array with metadata specifying a required format of the cell input upon interpretation of the form template as a form instance; and
sending the form template to the server for providing to form filling users.

16. The system as claimed in claim 15, wherein the memory is configured to provide computer program instructions to the processor for executing the step of defining validation rules for the inputs into a form instance of the form template.

17. The system as claimed in claim 15, wherein the memory is configured to provide computer program instructions to the processor for executing the step of defining workflow functionality for the inputs into a form instance of the form template.

18. A system for form design and data input in which a server provides a repository of form templates for distribution to multiple form filling client systems comprising a remote server having a processor and a memory configured to provide computer program instructions to the processor for executing the steps of:
providing an end-user programmable form template for accessing via client software at a form filling client system, wherein the form template includes multiple cells, wherein a plurality of the cells define formula-based values, further wherein a plurality of the cells include metadata determining a functionality of corresponding fields in form instances, wherein the metadata of at least one cell provides that at least one functionality of at least one field in the form instances is dynamically determined after receiving a user input in the form instances, further wherein the functionality includes specifying a required format of a user input in a field in the form instance, defining when a section of the form instance is visible to the user, defining when a section of the form instance is editable by a user input in the form instance, and defining validation rules for fields in the form instance,
further wherein the form template is configured to be converted into a form instance using the client software at the form filling client system, wherein the form instance is a distributable form format, further wherein the conversion includes translating the metadata for the plurality of cells in the form template into a translated functionality for the corresponding fields in the form instance including defining fields in the form instance with configuration points from the form template that determine when the section of the converted form template is visible in the form instance, defining fields of the form instance with configuration points from the form template to control when the section of the converted form template is editable with a user input in the form instance, and defining a validation input control of a user input in the form instance to ensure the user input is a correct type based on the metadata, and
further wherein the converted form template is configured to be rendered for display as the form instance according to according to the conversion of metadata of the form template, including providing displayable user interface input controls for fields of the form instance, wherein at least one of the translated functionalities is dynamically responsive to a user input in the form instance, further wherein the displayable user interface input controls are displayed based on the cell metadata from the form template and are not displayed in the form template;
receiving, via the client software at the form filling system, user inputs and values of formula-based cells of the form instance, the user inputs received input into fields in the form instance rendered by the client software at the form filling client system and evaluated by applying the validation rules at the form filling client, wherein sending inputs and values does not include sending the form instance or the form template;
storing the user inputs and values of formula-based cells in a database; and
collating and analyzing data input via multiple form instances of the form filling client systems.

* * * * *